March 17, 1953 R. G. METZNER 2,631,458

SPEED CHANGE MECHANISM FOR PHONOGRAPH TURNTABLES

Filed June 12, 1948 2 SHEETS—SHEET 1

Inventor

ROBERT G. METZNER

By Lyon & Lyon

Attorneys

Inventor
ROBERT G. METZNER.,
By Lyon & Lyon
Attorneys

Patented Mar. 17, 1953 2,631,458

UNITED STATES PATENT OFFICE 2,631,458

SPEED CHANGE MECHANISM FOR PHONOGRAPH TURNTABLES

Robert G. Metzner, Los Angeles, Calif.

Application June 12, 1948, Serial No. 32,611

2 Claims. (Cl. 74—190)

My invention relates to a speed change mechanism for phonograph turntables and more specifically to a device to connect a constant speed electric motor to a phonograph turntable which forms a positive drive and has a change speed mechanism incorporated therein so that the turntable can be rotated at various constant speeds.

The phonograph records sold to the general public usually are rotated at a relatively high rate of speed while those manufactured for radio transcription and the like are rotated at a relatively slow speed.

It is therefore an object of my invention to provide a phonograph turntable which is positively driven by a constant speed electric motor with a means for changing the speed at which the motor drives the turntable.

Another object of my invention is to provide a change speed mechanism between a phonograph and a constant speed motor which does not require complicated sets of gears or clutches.

Other objects and advantages of my invention will be apparent from the following description of the preferred embodiments.

Figures 1, 2, 3, 3A, 4, 5, 5A, 6:
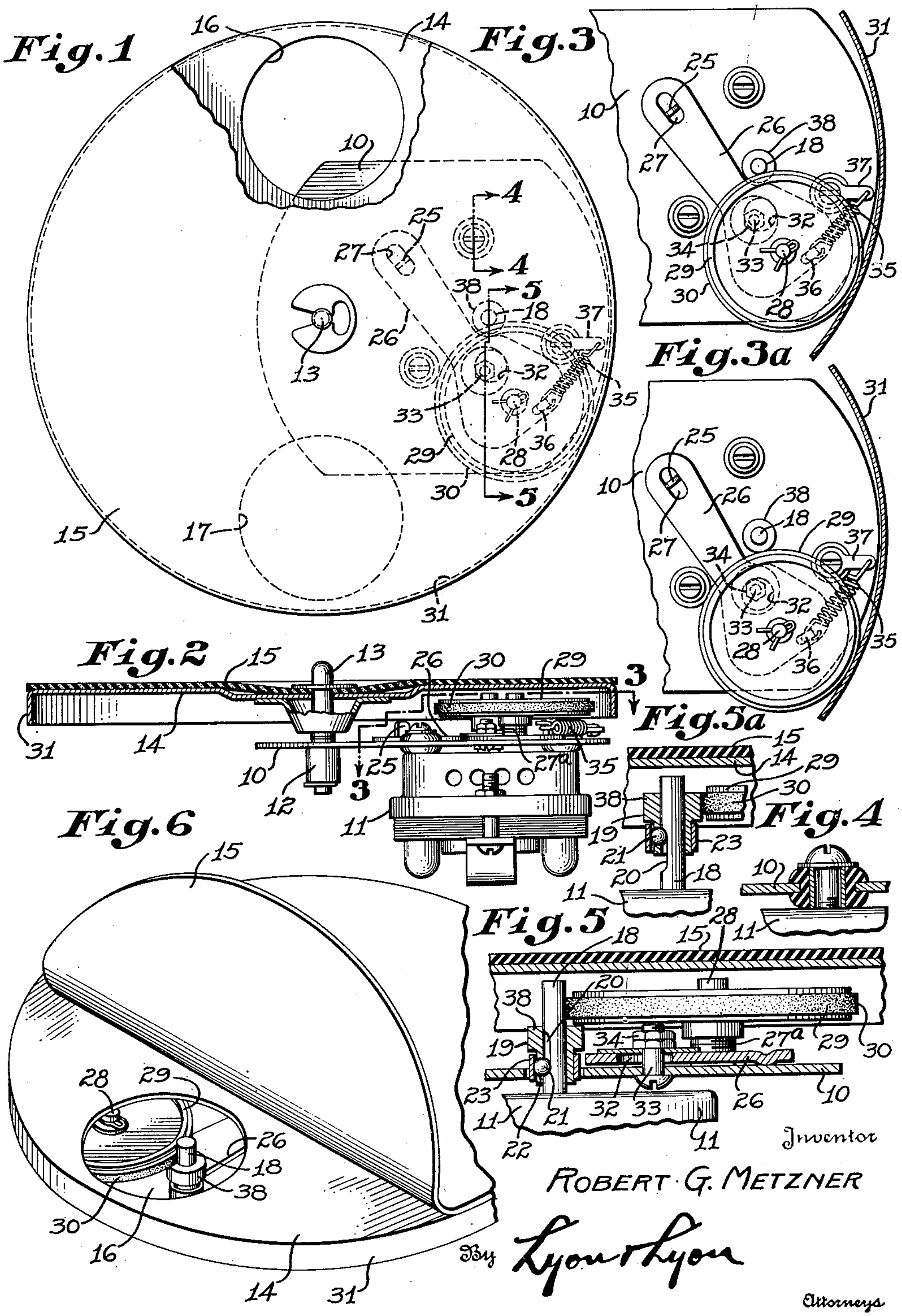
Figure 1 is a top plan view, partially broken away, of my invention.
Figure 2 is an elevational view with the turntable in section.
Figure 3 is a sectional view taken on the line 3—3 of Figure 2.

Figure 3*a* is a sectional view taken on the line 3—3 of Figure 2 showing the device in its opposite position from that in Figure 3.

Figure 4 is a sectional view taken on the line 4—4 of Figure 1.

Figure 5 is a sectional view taken on the line 5—5 of Figure 1.

Figure 5*a* is a fragmentary sectional view similar to Figure 5 showing the change speed mechanism in its opposite position from Figure 5.

Figure 6 is a perspective view.

Figures 7, 8, 9:
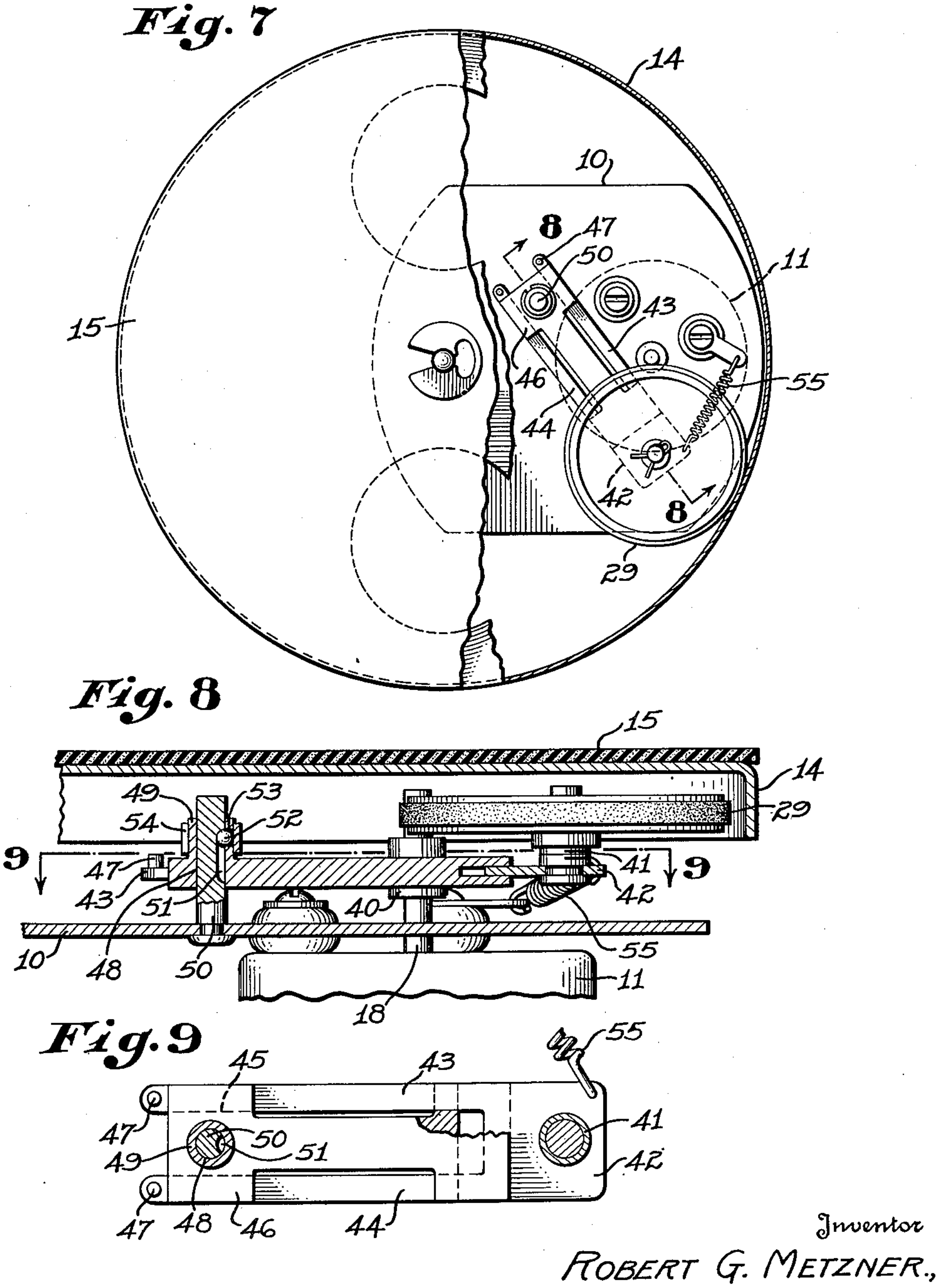

Figure 7 is a top plan view partially broken away of a modification of my invention.

Figure 8 is a sectional view taken on the line 8—8 of Figure 7.

Figure 9 is a sectional view taken on the line 9—9 of Figure 8.

A device constructed in accordance with my invention comprises a hanger plate 10 from which is supported a constant speed motor 11. A journal 12 forms a pivot for the pinion 13 to which is attached a phonograph turntable 14 which has thereon a rubber mat 15 to protect phonograph records.

Cutaway openings 16 and 17 are positioned in the turntable 14 to give access to the change speed mechanism by flipping back the rubber mat 15 as shown in Figure 6.

The motor shaft 18 of the constant speed motor 11 has a sleeve 19 mounted thereon. An elongated detent 20 is formed in the shaft 18. A ball 21 locks the sleeve 19 to the shaft 18 when positioned in the hole 22 and the detent 20. The ball 21 is held in position by a spring clip 23. The length of the detent 20 permits the sleeve 19 to be moved up and down upon the shaft 18.

Upon the upper surface of the hanger 10 is a projection 25 on which is pivotally mounted a lever 26 by means of the slot 27. The lever 26 has a collar 27*a* mounted thereon to encompass and hold the shaft 28 upon which an idler 29 is rotatively mounted. The idler 29 has around its perimeter a covering of rubber 30, or other material, which frictionally engages the inner surface 31 of the turntable 14. When the idler 29 is driven the same drives the turntable 14 by means of friction upon the inner surface 31.

Adjacent the collar 27*a* in the lever 26 is a hole 32 through which a bolt 33 attached to the hanger 10 extends. A nut 34 maintains the lever 26 in a flat relation to the hanger 10, but permits it to be moved in relation to the projection 25 and the bolt 33 in any direction as the hole 32 is much larger in diameter than the bolt 33.

A spring 35 connected to the projection 36 upon the lever 26 and a boss 37 upon the hanger 10 tends to move the lever 26 in a direction so that the rim of the idler 29 is in contact with the motor shaft 18 and the surface 31. The motor shaft 18, the idler 29 and the surface 31 of the turntable 14 are constructed in such a size with relation to the speed of the constant speed motor 11 that when the motor is operated and the idler 29 engages the shaft 18, the turntable will be rotated at a constant speed which is the desired speed for playing transcription records.

The sleeve 19 has a collar 38 thereon which has an exterior diameter that when contacting the idler gear 29 as shown in Figure 3*a*, the rotation of the shaft 18 will speed up the rotation of the idler 29 and turntable 14 to that of the ordinary commercial phonograph record. To accomplish this change in speed the rubber mat 15 is flipped back, the turntable rotated until it is in a position where one of the openings 16 or 17 is in the position shown in Figure 6 wherein it is possible to reach through the opening 16. By reaching through the opening 16 and moving the lever 26 sideways, the collar 38 can be moved up upon the shaft 18 until it is in a position directly opposite the idler 29 as shown in Figure 5*a*. The lever 26 is then released and the spring 35 will tension the idler 29 against the perimeter of the collar 38, thus forming a direct drive from constant speed motor 11 to the turntable 14 at a higher speed than when the motor shaft 18 was in contact with the idler 29.

In Figures 7–9, inclusive, is shown a modification of my invention. In this modification the motor shaft 18 has a collar 40 permanently affixed thereto to form a contacting surface for the idler 29. The idler 29 is mounted upon a pivot bearing 41 which is supported on telescoping slide plate 42. In this form of my invention, instead of moving the collar 40 up and down on the motor shaft, the slide plate 42, which supports the bearing 41 for the idler 29, is moved up and down so that the idler can bear either against the motor shaft 18 or against the collar 40. This is accomplished by having the slide plate 42 formed to make a U-shape with legs 43 and 44 slidably movable in slots 45 in the guide plate 46. Pins 47 prevent the legs 43 and 44 from being drawn completely from the slots 45. A boss 49 projects from the upper surface of the guide plate 46 and has a bore 48 extending therethrough. A shaft 50 is riveted to the hanger plate 10, and the bore 48 is adapted to slide upon the shaft 50. An elongated detent 51 is formed in the shaft 50. A ball 52 is positioned in the hole 53 and held there by the spring clip 54 to lock the boss 49 upon the shaft 50. This type of construction permits the guide plate 46 to be raised or lowered upon the shaft 50 and to thus cause the circumference of the idler 29 to bear directly on the motor shaft 18 or the collar 40, thus changing the speed ratio. A spring 55 tensions the idler against the driver and the turntable.

An advantage of my invention over all other turntable change speed mechanisms is that the mechanism can be readily reached and shifted from one speed to the other through the hole 16. For this reason the entire apparatus can be placed in a small cabinet as no linkage, gears or levers are run out to change the speed.

While I have described the preferred embodiments of my invention, I am not limited to any of the details of construction herein set forth except as described in the following claims.

I claim:

1. In a device of the character described, a hanger, a constant speed motor mounted thereon and having a drive shaft, a turntable rotatively journaled on said hanger, a lever movably attached to said hanger and rotatively carrying an idler wheel thereon, said idler wheel adapted to engage the perimeter of said shaft and said turntable to transmit rotation of said shaft to said turntable, and a sleeve on said shaft adapted to slide thereon and having a collar which is slidable into position between said shaft and said idler to increase the speed of rotation of said idler wheel and said turntable.

2. In a device of the character described, a hanger, a constant speed motor mounted thereon and having a drive shaft, a turntable rotatively journaled on said hanger, a lever movably attached to said hanger and rotatively carrying an idler wheel thereon, said idler wheel adapted to engage the perimeter of said shaft and said turntable to transmit rotation of said shaft to said turntable, a spring adapted to hold said idler gear in engagement with said shaft and said turntable, and a sleeve on said shaft adapted to slide thereon and having a collar which is slidable into position between said shaft and said idler to increase the speed of rotation of said idler wheel and said turntable.

ROBERT G. METZNER.

REFERENCES CITED

The following references are of record in the file of this patent:

UNITED STATES PATENTS

| Number | Name | Date |
|---|---|---|
| 2,047,733 | Harrison | July 14, 1936 |
| 2,260,319 | Hoehn | Oct. 28, 1941 |
| 2,381,079 | Pittman, Jr. | Aug. 7, 1945 |
| 2,438,264 | Bender, Jr. | Mar. 23, 1948 |
| 2,438,265 | Metzner | Mar. 23, 1948 |